INVENTORS
Georg Brion and
Arthur Johannes Krutzsch.

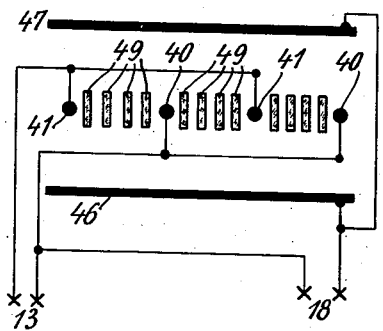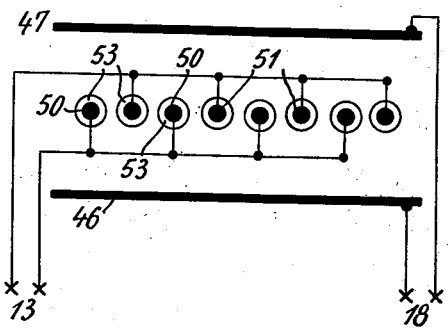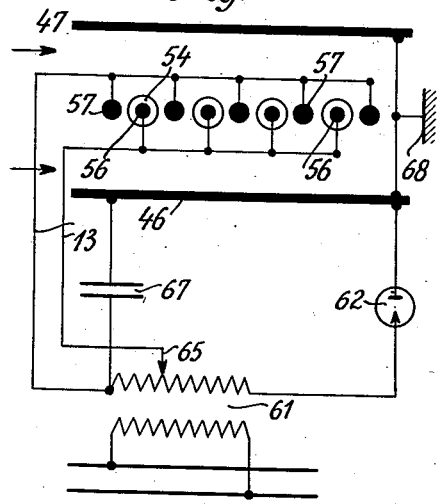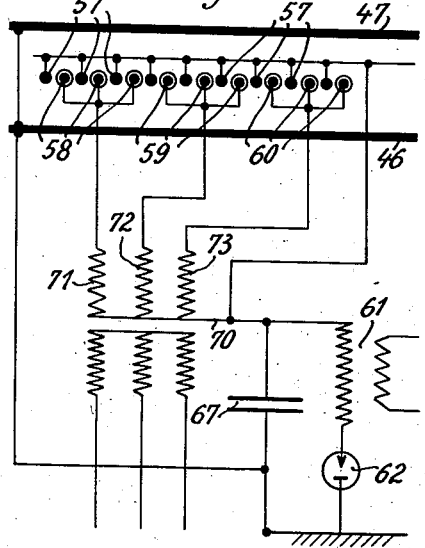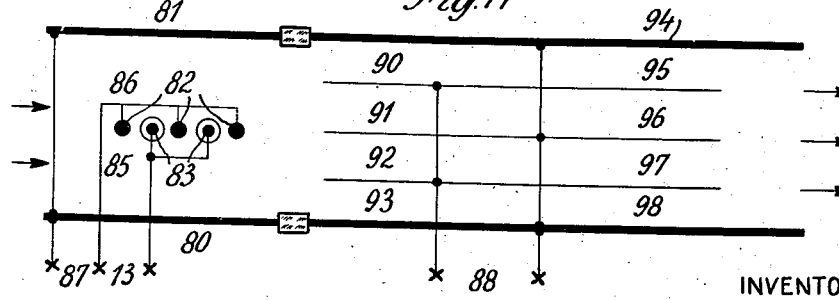
INVENTORS
Georg Brion and
Arthur Johannes Krutzsch.

Patented July 6, 1937

2,086,063

UNITED STATES PATENT OFFICE 2,086,063

ARRANGEMENT FOR THE ELECTRIC CLEANING OF GASES

Georg Brion, Freiberg, and Arthur Johannes Krutzsch, Munich, Germany, assignors to International Precipitation Co., Los Angeles, Calif.

Application November 30, 1931, Serial No. 578,164 In Germany December 4, 1930

8 Claims. (Cl. 183—7)

The invention relates to a new or improved arrangement for cleaning gases. By means of the improved arrangement or system it is possible to impart to the solid particles suspended or floating in the gas and to be precipitated from it, at comparatively low voltages, a very high electric charge, so that the particles flow towards the separating electrodes at a high velocity.

Comparatively short precipitation paths, and correspondingly small dimensions of the precipitation plant thus result, even when the gases to be treated travel at very high velocities. At the same time constructively and mechanically convenient shapes of the ionizer are permissible, as well as of the precipitation electrodes, so that dust precipitation or electric filtering plants constructed according to the invention are distinguished by low production costs and very high service reliability. The service voltage of the new arrangement or system may furthermore be considerably reduced in comparison with known apparatus so that in view of this, considerable advantages result as regards attendance, service reliability and capital cost.

In the apparatus according to the invention, the process of charging the particles of dust suspended in the gas and to be precipitated therefrom, is so to say, prepared or initiated by a voltage which effects the ionization of the gas, while the charging itself takes place in the field of a second separate and separately controllable voltage, which is at the same time able to propel the charged particles towards the precipitation electrodes.

According to the invention the intensity of the field necessary for the impact ionization is produced in a separate section of the space located sideways to the charging and precipitating zone or region, and electric charge carriers are formed in this way, while one or a plurality of other voltages not serving for the ionization propel the charge carriers into the charging zone and precipitate the charged particles.

With these and other objects in view the invention consists in certain novel combinations and arrangements of the parts as will more fully appear as the description proceeds, the novel feature thereof being pointed out in the appended claims.

For a full understanding of the invention reference is to be made to the following description and accompanying drawings in which:

Figs. 6 and 7 show in a diagrammatic cross-section two modifications of ionizing arrangements in which there are arranged sections of insulating material between the ionizing electrodes.

Fig. 8 is in diagrammatic cross-section, an arrangement similar to Fig. 2 but all ionizing electrodes being insulated, whilst Fig. 9 is a modification in which the ionizing electrodes are alternately bare or insulated.

Fig. 10 shows a precipitation plant representing in diagrammatic cross-section the electric connection, the ionizing voltage being a multiphase alternating current.

Fig. 11 is a diagrammatic cross-section of a precipitating plant in which the zone for ionizing and charging the particles within the gas is separated from the precipitating zone.

Figure 1:
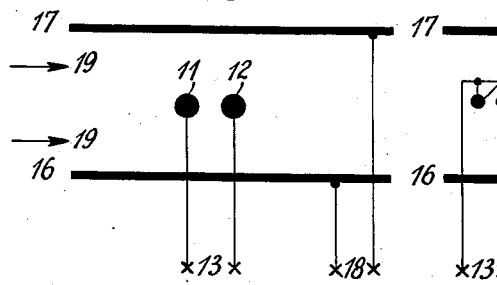
Fig. 1 shows diagrammatically in cross-section a precipitation plant showing two ionizing electrodes.

Referring to Fig. 1 of the drawings, 11 and 12 are two ionizing electrodes to which a suitable voltage, either direct or alternating voltage, is fed from any desired source of electromotive force 13, for the purpose of generating the ionizing field. The precipitation electrodes 16, 17 are supplied with a voltage, direct or alternating, from a source 18. Two zones are thus formed, of which the one serving for ionization extends mainly between the ionization electrodes, while the other zone, which in the present example is at the same time charging and precipitation zone, consists of the two partial zones, which extend towards the precipitation electrodes beyond the ionization electrodes.

If voltage is now supplied to the electrodes at sufficiently high voltage, charge carriers are generated between the electrodes 11, 12 by impact ionization, which carriers are propelled through the charging zone situated sideways to the ionization zone towards the precipitation electrodes, by the field existing between the electrodes 16, 17, and which is superimposed over the ionization field. Along this path of the electricity carriers the solid particles suspended in the gas flowing, for instance, in the direction of the arrows 19 between the precipitation electrodes, reach the precipitation electrodes under the influence of the field existing between the electrodes 16, 17 or a special field.

The electrodes 11, 12 between which the ionization field is generated may according to the choice of the voltage serving for the ionization be arranged more or less closely together, so that the ionization takes place under favourable condition. As the ionization is effected between these electrodes, the substantial advantage results, that the voltage beween the electrodes 16, 17, which propels the charge carriers into the charging zone and, under certain circumstances also precipitates the charged particles there, may be very low, because the expenditure of energy for propelling the electric charge carriers into the charging zone and for precipitating the charged particles is considerably smaller than that necessary for the ionization. In view of the fact that the ionization is produced by a voltage different from that for the charging and precipitating, high unipolar space charges may, in the improved apparatus, be generated in a simple manner. By supplying a high alternating current voltage to the ionization electrodes an intensive ionization may be effected, while by the supply of a direct voltage between the other electrodes the charges are conveyed into the charging zones without any considerable expenditure of energy, and there form unipolar space charges of opposite signs at both sides of the ionization electrodes.

The effect of a unipolar space charge may also be obtained by feeding the electrodes 16, 17 with a very slowly pulsating alternating current, for instance at ten cycles per second or less. As the space charge then changes its sign in intervals which are long in comparison with the short precipitation periods, the action is similar to that obtained by employing a direct voltage. The solid particles pass without charge reversal directly to the oppositely charged precipitating electrode and by virtue of the high charge imparted to them by the apparatus constructed according to the invention, with a very high velocity, so that even when the gases travel at a high velocity the particles quickly reach the precipitating electrodes, and the electrodes and the apparatus may thus have small dimensions. The employment of a slowly pulsating alternating current for generating the charging field results in the further advantage that the rectification of the alternating current, otherwise necessary, is now eliminated.

Since in the arrangement according to the invention, the ionization is effected in a section of the space which is situated sideways to the charging and precipitating zone or region, very advantageous designs of apparatus are arrived at which permit of an intensive and uniform utilization of the space available for the ionization, charging and precipitation, if according to a further development of the invention the impact ionization zone located sideways to the charging and precipitating zone is given the form of a plane surface or area. Various means may be employed for giving the ionization zone the form of a surface. Thus substantially linearly extending conductors 11 and 12, as shown in cross-section in Fig. 1, may be arranged side by side in a row.

Figure 2:
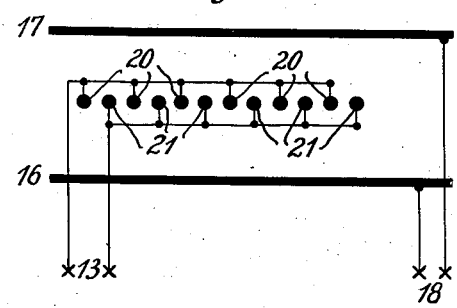
Fig. 2 is a diagrammatic cross-section of another precipitation plant with a series of ionizing electrodes alternately connected to the ionizing circuit.

Such an embodiment is illustrated in Fig. 2. Bar or rod electrodes 20, 21 are here arranged in a row to form a surface or level plane. The electrodes are alternately connected to one or the other terminal of any suitable source of voltage 13. In the example illustrated, there thus result two sets of linear conductors parallel to and connected in parallel to one another. If a sufficiently high voltage is supplied to the ionization electrodes 20, 21, ionization takes place in a zone of the space which extends in a surface or plane and at both sides of which adjoin the charging and precipitation zones towards the precipitation electrodes 16, 17 and through which the stream of gas is conducted parallel to the ionization surface. The members 20, 21 may be designed as solid bars or rods of any desired cross-section or as tubes or chains, and constructed of any desired electrically conducting material.

By distributing the ionization electrodes in multiple sub-division in one plane of the ionization surface, a design results which permits of providing a ready ionization, definitely and uniformly utilizing the space, for any working conditions, flow velocities, nature and quantities of dust to be precipitated or separated. At the same time the further advantage results that in consequence of the multiple subdivision of the ionization electrodes and their arrangement in one surface or plane, the intensity of the field in the charging and precipitating zone practically becomes constant in space so that the electric charge carriers also travel towards the precipitating electrodes in practically constant current density as regards space.

Figure 3:
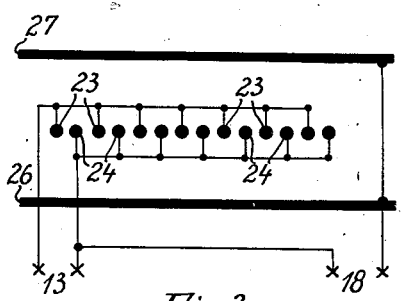
Figs. 3–5 show similar diagrammatic cross-sections of modifications of our invention.

Fig. 3 illustrates a further example of an apparatus designed with an impact ionization zone located in a surface, in which the voltages supplied to the ionization electrodes and the charging or precipitating electrodes respectively are interlinked. In this example the voltage of the charging or separating zone 18 is located between one terminal of the ionization electrodes 24 and the parallel connected dust precipitating or separating plates 26, 27, while the voltage 13 supplied to the ionization electrodes is supplied to the two sets of parallel and in parallel connected bar-shaped electrodes. Thus in this system of connections, in which the charging and precipitating field between the ionization electrodes arranged in one plane is designed to extend symmetrically towards the two precipitating electrodes, two completely equivalent and identical sections of the system are produced, for which the ionization surface forms a symmetry plane. Each half contains all the members necessary for carrying out the method of the invention, so that each half, consisting of an ionization surface and a precipitation electrode, suffices by itself to effect the cleaning or purification of gas or vapours.

Figure 4:
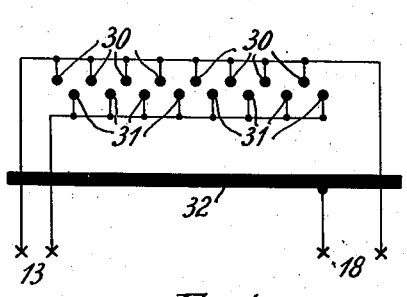

By the described systems in which the ionization field is produced between the ionization electrodes, only a portion of the electricity carriers produced is propelled out of the ionization zone into the charging zone by the superimposed field of the charging voltage and utilized for the electric purification or cleaning of gas. The remaining electricity carriers compensate directly by neutralizing each other. The number of useful electricity carriers may, however, be increased if the two sets 30 and 31 of parallel and connected in parallel bar-shaped electrodes are displaced or staggered in relation to each other, as shown in Fig. 4. In this example one set of electrodes serves at the same time as second electrode of the charging voltage, while as other electrode in this example of construction there is provided a plate 32.

Figure 5:
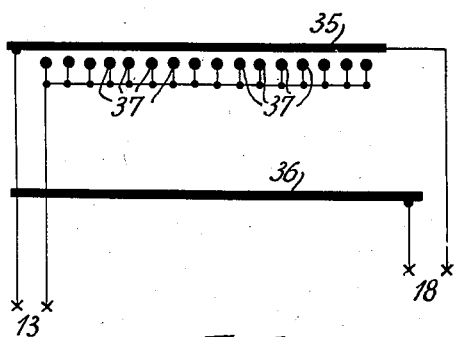

Fig. 5 shows a further example in which the ionization electrode forms a surface or plane. In this example the plates 35, 36 serve as electrodes of the charge and separation voltage, while the plate 35 at the same time serves as one electrode of the ionization voltage. It is faced by a set of bar ionization electrodes 37 located and connected in parallel. The ionization takes place between the plate 35 and the set of ionization electrodes 37 while the charging and separating zone extends along the other side of the rows of bar electrodes 37 towards the plate electrode 36.

In the arrangements according to the invention it is now possible to bring about certain desirable configurations of the ionization field and also uniformity of the discharges over the entire surface available for the ionization, if, according to a further feature of the invention the ionizing field is generated in spaces which are located transversely to the field lines and consist of layers of gas and badly conducting substances. The layer of gas may consist of any gaseous medium which fills or traverses the system, while as a badly conducting layer any dielectric material, such as glass, porcelain, rubber products or other resinous products, mica or others may serve. As badly conducting materials semi-conductors, such as slate or concrete, suitable hard papers, and the like, may also be employed, by which with the aid of metallic admixtures or without such additions semi-conductor effects can be obtained in conjunction with the conductors. The bad conductors may be solid or also liquid being arranged in layers in any suitable manner, for instance by vessels.

Figure 6:
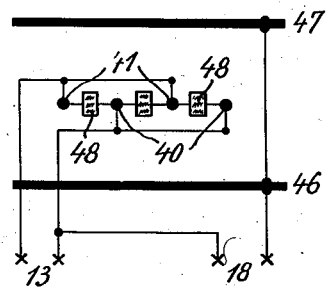

The ionization electrodes may be arranged in groups of two or more in any desired form. The ionization surface may, as described above, be provided in a section of the space located sideways to the charge and separation zone, and the intensity of the field necessary for the impact ionization may be generated by one voltage, while one or more other voltages not serving for the ionization convey the electric charge carriers formed by the ionization into the charging zone and then precipitate the particles charged therein. The arrangement or system is particularly valuable if the ionization region situated sideways to the charging and separating region is given the form of a plane surface or area, and if the ionization electrodes are distributed in multiple over this surface and thus effect current densities practically constant in space in the charging and precipitating region. Some examples of the arrangement according to the invention, more particularly of those in which the ionization zone or region is formed as a surface, are illustrated in Figs. 6—8 of the drawings.

The electrode plates of the charging and precipitation voltage respectively are marked by the reference numerals 46, 47. Between these plates bar electrodes 40, 41 are arranged. The electrodes are supplied with voltage in the manner described heretofore, and the voltage fed to the charging and precipitation electrodes respectively may be entirely separate from the voltage supplied to the ionization electrodes, as, for instance shown in Fig. 8, or be interlinked with it, as illustrated in Figs. 6, 7 and 9.

In the example described above one ionization electrode or one of the two sets or lots of the ionization electrodes may thus simultaneously serve as an electrode of the charge or separation voltage. A simple wiring system is then arrived at, if according to the arrangement shown in Fig. 6 the two charging or precipitation plates are connected in parallel, as shown in Figs. 6, 7 and 9. If the voltages are supplied to electrodes separately, the potentials should preferably be so chosen, that the medium potential of the ionization electrodes lies between the potentials of the separation electrodes and the electrodes of the charge voltage respectively, which may be effected by means of suitable systems of connection, interconnection or linking-up of transformers or in any other suitable manner.

The ionization electrodes may in all the examples have any desired form; preferably they are given the form of bars or rods. In the case of flowing gases to be cleaned this bar-shaped conductor may be placed either in the direction or transversely to the direction in which the gas flows between the electrodes of the charge and separation voltage respectively.

In the examples illustrated in Figs. 6 and 7 the layer of badly conducting substances is given the form of a bar or plate. In the example of Fig. 6 an insulating bar 48 is situated between any two ionization electrodes 40, 41, while in the example according to Fig. 7 a plurality of bars 49 of badly conducting material are placed between the ionization electrodes. In this case also the field generating the ionization may be adjusted and distributed as desired by a suitable form, proportions, nature, material of the bars as well as the magnitude of the voltages.

Simple conditions from a structural point of view are obtained if the layers of poorly electrically conducting material envelope the conductors of the ionization electrodes, whether the badly conducting layers are applied to the conductors in the form of a coating, or whether they form tubes containing the solid or fluid bad conductors.

In the example according to Fig. 8 of the drawings all the conductors 50, 51 of both sets of ionization electrodes are enveloped by layers 58 of badly conducting materials.

A particularly favourable and electrically highly efficient embodiment of the invention from a structural point of view is arrived at if, as disclosed by Fig. 9, merely one set 56 of ionization electrodes is enveloped by badly conducting or insulating material 54, while the conductors 57 of the other set are provided with electrically conducting surfaces. By this arrangement, in which the surface of one set of conductors 57 remains electrically conducting the result is obtained that the charges propelled by the charging field cannot accumulate on the ionization electrodes acting as condenser, but flow away through the electrically conducting surfaces of the electrode or electrodes of one polarity. The distortion of the field adversely affecting the action of the new arrangement is therefore eliminated, which invariably occurs if the layer enveloping the conductors is of bad conducting capacity.

The new arrangements are thus equally well applicable for operation with direct current as with alternating current for the charging and separating field. The ionizing electrodes themselves are preferably fed with alternating current, as in the arrangements described up to now. High frequencies may be employed, in which case a vigorous ionization is obtained even at low voltages, or the standard system frequency of, for instance, 50 cycles per second may be used and the voltage chosen correspondingly high. If a direct current voltage is used for the charging field and an interlinked connection is employed, as shown in Figs. 3 and 9, for instance, the ionization surface is preferably given a medium negative potential in relation to the potential of the electrodes of the charging voltage, in view of the fact that the mobility of the electrons or negative ions is substantially greater than that of the positive ions.

The conditions, proportions, and spacing of the electrodes and their voltages are preferably so chosen that the intensity of the field of the ionizing voltage or voltages is high in relation to the intensity of the field of the non-ionizing voltage or voltages. In this way, there results a concentrated intensive and sharply confined ionization field and a favourable cooperation with the charging field. The operation reliability of the plant is at the same time substantially increased, because flashovers towards the precipitating electrodes are avoided with certainty even in the case of well conducting dust or other particles.

As separate voltages are supplied to the electrodes, it is possible to adjust or regulate the pairs of electrodes also during the service independent of one another, so that the plant designed along the lines of the invention operates under the most favourable working conditions. On the other hand it is possible to master completely the conditions of the charge and the precipitation. A uniform current density, constant as regards space, is attained by arranging in a surface-like, more particularly flat, ionization zone the electrodes of the charging voltage or precipitating voltage respectively parallel to the ionization surface and symmetrically at both sides and equidistant from it.

As source of E. M. F. the usual generators for direct or alternating current may be employed. Particularly simple and convenient switchgear is obtained, if ionization, charging and separating voltage or at least two of these voltages are taken from the same transformer, if desired by interposition of a rectifier.

A diagram of connections of this kind is illustrated in Fig. 9. The transformer is designated by the reference numeral 61. From the secondary winding of this transformer is derived the ionization voltage as well as that voltage which serves for charging and precipitating the floating particles. If the two voltages are identical they may be taken from the terminals of the secondary, if the voltages differ the lower voltage, for instance, the voltage to be supplied to the ionization electrodes 56, 57, may be taken by means of the tap 65, for example, while the voltage between the terminals of the transformer are in the example illustrated converted into direct current voltage by means of the rectifier 62 and, on the one hand, fed to the ionization electrodes and, on the other hand, to the plate electrodes 46, 47.

For smoothing the direct current voltage a condenser 67 is connected in parallel to its electrodes. As rectifier may be employed any desired apparatus for converting alternating current into direct current, such as mechanical rectifiers, valves or spark gaps, or electron tubes of any kind.

The precipitation plates and the cathode of the rectifier are grounded at 68.

In Fig. 10 of the drawings is shown another example of a transformer connection. In this example the conductors 57 with conducting surface are connected to the star point 70, the insulation enveloped conductors in groups 58, 59, 60 to the phases 71, 72, 73 of a polyphase transformer. In this way it is also possible to employ polyphase current for feeding the ionization electrodes and to load the individual phases uniformly with power.

In the example described hereinbefore the electrodes for the separation or precipitation voltage served at the same time as electrodes for the charging voltage. It will be readily understood, however, that the invention is by no means confined to this arrangement. The arrangement in which an ionization field is generated sideways to the charging space by means of a separate voltage, while another voltage conveys the charge carriers formed by ionization into the charging zone, may equally well be made so that in the direction of the current of gas the separation space is situated behind the charging space.

A design of this nature is by way of example illustrated in Fig. 11 of the drawings. Between the electrodes 80, 81 for the charging voltage there is sideways to the charging space 85, 86 located an ionization zone consisting of two conductors or sets of conductors 82, 83 respectively, which may be designed in any manner described herein, and to which the voltage is fed from two supply systems 13 and 87 respectively in the manner just described. Behind the charging space there is situated the separation space 90, 91, 92, 93, in which a plurality of sets of electrodes are arranged in suitable manner in parallel and in parallel connection. As in the other examples the electrodes may in this case also consist of plates, sheets, grids, networks and so on. While in the first section of the arrangement, in which lie the ionization field and the charging region, the field, more particularly that of the ionization region, is kept high, the intensity of the field in the separation or precipitation region between the plates 94, 95, 96, 97, 98 is chosen lower. The ionization thus takes place only between the ionization electrodes 82, 83, while the charging of the particles floating in the gases takes place in the space at the sides of the ionization region between the electrodes 80, 81. As the particles or solid matter reach the region between the separation electrodes in a highly charged state, very low field strengths suffice in this region, and thus a low voltage to be supplied from the net 88 to precipitate all solid matter in the gas or vapours quickly, even at high flow velocities.

A further advantage of the improved arrangement resides in the fact that the spacing of the plates may be very small without the hazard of a flashover, because the ionization of the suspended particles already has taken place in a room ahead of the separation, deposition or precipitation region. Owing to the closeness of the plates a short precipitation path of the charged particles is also obtained.

Having thus described our invention, what we claim as new and desire to secure by Letters Patent, is:—

1. In an electrical gas cleaning apparatus, the combination of a collecting electrode having an extended surface, two linear ionization field electrodes parallel to and spaced from one another and also parallel to and spaced from the surface of said collecting electrode, one of said ionization field electrodes being enveloped by insulating material and the other consisting of a bare conductor, a source of electric potential connected to said ionization field electrodes for creating therebetween an electric field of sufficient intensity to cause ionization, and a source of electric potential connected to one of said ionization field electrodes and to said collecting electrode for creating therebetween an electric precipitating field.

2. In an electrical precipitator, the combination of a plate or plate-like collecting electrode, a series of parallel linear ionization field electrodes disposed in a plane substantially parallel to the collecting electrode, alternate ones of said ionization field electrodes being enveloped by insulating material and the other ionization field electrodes consisting of bare conductors, a source of electric potential connected to the respective sets of ionization field electrodes for creating therebetween an electric field of sufficient intensity to cause ionization, and a source of electric potential connected to said collecting electrode and to one of the sets of alternate ionization field electrodes for creating therebetween an electric precipitating field.

3. In an electrical gas cleaning apparatus, the combination of a collecting electrode having an extended surface, two ionization field electrodes spaced from one another and also spaced from the surface of said collecting electrode, a layer of insulating material disposed between said ionization field electrodes, a source of electric potential connected to said ionization field electrodes for creating therebetween an electric field of sufficient intensity to cause ionization, a source of electric potential connected to one of said ionization field electrodes and to said collecting electrode for creating therebetween an electric precipitating field, and means for adjusting the potential supplied by the first mentioned source independently of the potential supplied by the last mentioned source.

4. In an electrical gas cleaning apparatus, the combination of a plate or plate-like collecting electrode, a series of parallel linear ionization field electrodes disposed in a plane parallel to and spaced from the surface of said collecting electrode, a polyphase transformer, means connecting one set of alternately disposed ionization field electrodes to the star point of said transformer, means connecting the other set of alternately disposed ionization field electrodes in groups to the respective phases of said transformer, for creating between said ionization field electrodes an electric field of sufficient intensity to cause ionization, and a source of electric potential connected to the first mentioned set of ionization field electrodes and to said collecting electrode for creating therebetween an electric precipitating field.

5. In an electrical gas cleaning apparatus, the combination of means defining a conduit, two linear ionization field electrodes in said conduit parallel to and spaced from one another, one of said ionization field electrodes being enveloped by insulating material and the other consisting of a bare conductor, a source of electric potential connected to said ionization field electrodes for creating therebetween an electric field of sufficient intensity to cause ionization, an extended collecting electrode surface and a source of electric potential connected to said collecting electrode surface for creating an electric precipitating field in said conduit terminating on said collecting electrode surface.

6. In an electrical gas cleaning apparatus, the combination of means defining a conduit, two linear ionization field electrodes in said conduit parallel to and spaced from one another, one of said ionization field electrodes being enveloped by insulating material and the other consisting of a bare conductor, a source of electric potential connected to said ionization field electrodes for creating therebetween an electric field of sufficient intensity to cause ionization, an extended collecting electrode surface, an attenuated electrode and a source of electric potential connected to said collecting electrode surface and said attenuated electrode for creating an electric precipitating field therebetween.

7. In an electrical gas cleaning apparatus, the combination of means defining a conduit, two linear ionization field electrodes in said conduit parallel to and spaced from one another, one of said ionization field electrodes being enveloped by insulating material and the other consisting of a bare conductor, a source of electric potential connected to said ionization field electrodes for creating therebetween an electric field of sufficient intensity to cause ionization, an extended collecting electrode surface, an attenuated electrode and a source of electric potential connected to said collecting electrode surface and said attenuated electrode for creating an electric precipitating field therebetween, said attenuated electrode being provided by one of said linear ionization field electrodes.

8. In an electrical gas cleaning apparatus, the combination of means defining a conduit, two linear ionization field electrodes in said conduit parallel to and spaced from one another, one of said ionization field electrodes being enveloped by insulating material and the other consisting of a bare conductor, a source of electric potential connected to said ionization field electrodes for creating therebetween an electric field of sufficient intensity to cause ionization, an extended collecting electrode surface, an attenuated electrode separate from said linear ionization field electrodes and a source of electric potential connected to said collecting electrode surface and said attenuated electrode for creating an electric precipitating field therebetween.

GEORG BRION.
ARTHUR JOHANNES KRUTZSCH.